United States Patent
Ruiters et al.

(10) Patent No.: US 10,859,131 B2
(45) Date of Patent: Dec. 8, 2020

(54) METHOD FOR ACTUATING A MULTI-PLATE CLUTCH

(71) Applicant: GKN Automotive Ltd., Redditch (GB)

(72) Inventors: Volker Rene Ruiters, Siegburg (DE); Andreas Langhanki, Duisburg (DE); Rainer Brüning, Rheine (DE)

(73) Assignee: GKN Automotive Ltd., Redditch (GB)

( * ) Notice: Subject to any disclaimer, the term of this patent is extended or adjusted under 35 U.S.C. 154(b) by 0 days.

(21) Appl. No.: 16/467,103

(22) PCT Filed: Dec. 7, 2016

(86) PCT No.: PCT/EP2016/080054
§ 371 (c)(1),
(2) Date: Jun. 6, 2019

(87) PCT Pub. No.: WO2018/103833
PCT Pub. Date: Jun. 14, 2018

(65) Prior Publication Data
US 2019/0390722 A1    Dec. 26, 2019

(51) Int. Cl.
*F16D 48/08*    (2006.01)
*F16D 13/52*    (2006.01)
(Continued)

(52) U.S. Cl.
CPC .............. *F16D 48/08* (2013.01); *F16D 13/52* (2013.01); *F16D 48/066* (2013.01); *B60K 17/34* (2013.01);
(Continued)

(58) Field of Classification Search
CPC ........ F16D 48/066; F16D 48/08; F16D 13/52; F16D 2500/10431; F16D 2500/1045; F16D 2500/50239; B60K 17/34
See application file for complete search history.

(56) References Cited

U.S. PATENT DOCUMENTS 5,133,326 A    7/1992    Nishimura et al.
6,314,342 B1    11/2001    Kramer et al.
(Continued)

FOREIGN PATENT DOCUMENTS

DE    102014007090 B3    9/2015
EP    2620666 A1    7/2013
(Continued)

OTHER PUBLICATIONS

International Search Report and Written Opinion for PCT/EP2016/080054 dated Aug. 16, 2017 (13 pages; with English translation).
(Continued)

*Primary Examiner* — Huan Le
(74) *Attorney, Agent, or Firm* — Bejin Bieneman PLC

(57) ABSTRACT

Controlling a multiplate clutch situated between an input shaft and an output shaft for the switchable transmission of torques, wherein in the event of a torque request and a subsequent engagement of the multiplate clutch, includes:
a) determining a setpoint engagement force, acting in an axial direction, of the multiplate clutch for transmitting a setpoint torque to the output shaft;
b) determining and setting a limiting engagement force that is less than the setpoint engagement force, and
c) setting the setpoint engagement force in a time-delayed manner;
wherein a transmission of an actual torque is achieved by limiting the setpoint engagement force to the limiting engagement force, so that a maximum actual torque that is transmitted upon engagement of the multiplate clutch exceeds a setpoint torque to be transmitted by at most 5%.

15 Claims, 2 Drawing Sheets

(51) Int. Cl.
*F16D 48/06* (2006.01)
*B60K 17/34* (2006.01)
(52) U.S. Cl.
CPC ............... *F16D 2500/1045* (2013.01); *F16D 2500/10431* (2013.01)

(56) References Cited

U.S. PATENT DOCUMENTS

| | | | | |
|---|---|---|---|---|
| 2004/0064233 | A1* | 4/2004 | Iida | F16D 48/064 |
| | | | | 701/69 |
| 2005/0064987 | A1* | 3/2005 | Budal | B60W 10/06 |
| | | | | 477/3 |
| 2006/0236798 | A1* | 10/2006 | Krauss | F16H 61/688 |
| | | | | 74/325 |
| 2016/0076605 | A1* | 3/2016 | Kim | F16D 48/06 |
| | | | | 701/68 |

FOREIGN PATENT DOCUMENTS

| | | |
|---|---|---|
| JP | S63-235729 A | 9/1988 |
| JP | 2005319871 A | 11/2005 |
| JP | 2007176298 A | 7/2007 |
| JP | 2009079603 A | 4/2009 |

OTHER PUBLICATIONS

JPO Office Action for Application No. JP2019-530647 dated Aug. 4, 2020 (English translation only; 3 pages).

\* cited by examiner

METHOD FOR ACTUATING A MULTI-PLATE CLUTCH

CROSS-REFERENCE TO RELATED APPLICATIONS

This application is a national stage of, and claims priority to, Patent Cooperation Treaty Application No. PCT/EP2016/080054, filed on Dec. 7, 2016, which application is hereby incorporated herein by reference in its entirety.

BACKGROUND

A multiplate clutch is an integral part of an electromotively actively regulated clutch for selectable or permanent all wheel drives, known as Electronic Torque Manager (ETM) or Electro-Magnetic Control Device (EMCD), which is also usable as an active axle lock.

The multiplate clutch is preferably an integral part of a hydraulic clutch actuator (HCA).

Multiplate clutches of this type are known in which outer plates are connected to an outer plate carrier, and inner plates are connected to an inner plate carrier, in a rotationally fixed manner. Each plate carrier is connected in a rotationally fixed manner to a component of the group comprising the input shaft and the output shaft. Due to action by an engagement force in an axial direction, the plates are brought into contact with one another, so that a torque may be transmitted from the input shaft to the output shaft via the clutch.

In the control of multiplate clutches, it has been shown that a rapid buildup in the multiplate clutch of a torque to be transmitted may result in overshoots in the torque. These overshoots (in which torques, which in some cases greatly exceed the setpoint torque, are transmitted via the multiplate clutch) may result in overload and damage, possibly destruction, of the multiplate clutch itself as well as other components of the motor vehicle.

SUMMARY

The present disclosure relates to controlling a multiplate clutch, in particular a multiplate clutch situated on a side shaft of a motor vehicle, so that as the result of engaging the multiplate clutch, only one wheel of the motor vehicle is connected to a drive unit of the motor vehicle in a torque-transmitting manner. The damage in the drive train due to transmission of excessively high torques can thereby be prevented.

A method is disclosed for controlling a multiplate clutch situated between an input shaft and an output shaft for the switchable transmission of torques. In the event of a torque request and (before or during) a subsequent engagement of the multiplate clutch, at least the following steps are carried out:
a) determining a setpoint engagement force, acting in an axial direction, of the multiplate clutch for transmitting a setpoint torque to the output shaft;
b) determining and setting a limiting engagement force that is less than the setpoint engagement force, and
c) setting the setpoint engagement force in a time-delayed manner;

wherein a transmission of an actual torque is achieved by limiting the setpoint engagement force to the limiting engagement force, so that a maximum actual torque that is transmitted upon engagement of the multiplate clutch exceeds a setpoint torque to be transmitted by at most 5%.

The setpoint torque represents the torque that is to be transmitted by the multiplate clutch to an output shaft. This request is relayed to the multiplate clutch via a control unit, resulting in at least partial engagement of the multiplate clutch. In particular, the setpoint torque is less than a torque that is provided by the input shaft.

The multiplate clutch in particular has a rotational axis, and is situated coaxially with respect to the input shaft and the output shaft. The plates of the multiplate clutch extend about the rotational axis in the circumferential direction and are connected to plate carriers in a rotationally fixed manner.

For transmitting a predefined setpoint torque, typically a setpoint engagement force by means of which the plates are pressed together is set at the multiplate clutch. It has been shown that, in particular when there is rapid buildup of a torque, overshoots occur which greatly exceed the setpoint torque to be transmitted. Various causes have been identified for these overshoots, as described in greater detail below. To avoid or limit these overshoots it is now disclosed that the engagement force is not immediately increased to the setpoint engagement force, but, rather, is initially increased only to a limiting engagement force, which is at least 5%, or at least 10%, or even at least 20%, less than the setpoint engagement force.

The setting of the limiting engagement force is maintained in particular for approximately 0.02 to 0.2 seconds. The setpoint engagement force required for transmitting the setpoint torque is set only afterwards (i.e., with a time delay).

The stated percentages depend on the system in which the multiplate clutch is installed. This system includes the drive unit and the components, provided between the drive unit and the multiplate clutch, that are used for transmitting torques. The limiting engagement force results from the occurring overshoots if the setpoint engagement force were controlled directly. Mechanical deformations, system friction, or the like also play a role. In addition, the duration is in particular dependent on the system. For example, the length of time until the system goes into a uniform sliding phase and the overshoots are eliminated is important. If the stated limits are exceeded, for example components may be damaged, or reactions that are perceptible to a customer (for example, "jerking" or vehicle motions such as yawing) are created.

Upon engagement of the multiplate clutch, a maximum actual torque occurs which exceeds the setpoint torque to be transmitted by at most 5%. The actual torque may also be less than the setpoint torque to be transmitted. The actual torque may be set so that it is in the range of 80% to 105% of the setpoint torque to be transmitted.

In particular, the multiplate clutch is situated on a side shaft of a motor vehicle for transmitting torques, so that as the result of engaging the multiplate clutch, only one wheel of the motor vehicle is connected to a drive unit of the motor vehicle in a torque-transmitting manner. The multiplate clutch is thus not a clutch of a motor vehicle that is situated between the drive unit and a shiftable transmission of the motor vehicle. Such multiplate clutches situated on the side shafts must (often) process abrupt changes in a setpoint torque to be transmitted, so that the problems stated at the outset have thus far been intensified even further.

The torque request thus represents an abrupt change in a setpoint torque. When there is an abrupt change, a setpoint torque is increased to a significantly higher value within a short time; for example, within at most 0.5 seconds the setpoint torque is increased at least by a factor of 2 to 10, preferably by a value of at least 300 newton meters (Nm).

The setpoint torque that is requested via the torque request represents a nominal torque that is defined for the present multiplate clutch. For example, the setpoint torque is changed to a value that is at least 90%, or at least 95%, or at least 99%, of the nominal torque of the multiplate clutch. The nominal torque is the torque that the multiplate clutch has been designed to transmit; i.e., torques may be transmitted up to this level of torque, with the aim of attaining a planned service life of the multiplate clutch.

According to one embodiment, the limitation to a limiting engagement force during the engagement of the multiplate clutch is eliminated after a transition from a static friction condition, present between the plates, to a sliding friction condition. This means that the setpoint engagement force is set afterwards.

The above-described problem of overshoots of the torque to be transmitted arises in particular during special starting situations of the motor vehicle. For example, so-called "jackrabbit starts," mu-jump starts, and mu-split starts result in torque overshoots (the setpoint torque is exceeded by up to 30%, over an extended time period) which may overload and destroy the system, not only the multiplate clutch, for example, but also other components of the motor vehicle. Thus far, the clutch transmission behavior has not been fully taken into account.

In particular for a mu-split start, the road friction coefficient is different between left and right (i.e., for a wheel on the left side of the motor vehicle and a wheel on the right side of the motor vehicle). Generally, low mu (low friction coefficient, for example ice) is present on one side, and high mu (high friction coefficient, for example asphalt) is present on the other side. During starting, the torque is distributed over the multiplate clutch toward the wheel or the side of the motor vehicle at which high mu is present so that optimal acceleration of the motor vehicle may be achieved.

In particular a mu-jump start is similar, but in this case the difference in friction coefficients is not between the left side and the right side, but, rather, between a front axle and a rear axle.

A "jackrabbit start" describes starting with maximum acceleration. In the process, a vehicle clutch is depressed (i.e., a clutch pedal is actuated by the driver) and a first gear is engaged. The driver then gives full acceleration and abruptly releases the vehicle clutch (the foot of the driver actuating the clutch pedal is pulled off to the side). With this type of start, energy is suddenly applied to the drive train, so that specifically in this case, overshoots occur and components of the motor vehicle may be damaged.

It has been found that when the drive train is in mounted engagement, which may vary greatly for the various systems and drive train configurations, the friction coefficient and/or the engagement force of the (plate) clutch are/is higher than with a rotational speed difference. A behavior may be assumed or mapped that varies the friction coefficient as a function of a rotational speed difference. The friction coefficient is not to be regarded here in the conventional sense as a single effective friction coefficient of the clutch lining, and instead also involves other effects.

Thus, for example, it is also (indirectly) taken into account that the engagement force in the plate assembly is higher with a virtually zero rotational speed difference, since the friction losses at the entrainment points of the plates almost completely disappear. Deformation of components that results in increased engagement force or torque may thus be easily taken into account. By simple identification, this approach allows many phenomena that have a similar, interrelated effect (torque overshoots) to be taken into consideration. The approach thus goes beyond the simple assumption of stick-slip friction or Stribeck friction behavior, since this behavior considers only effects on the friction surface.

If the engagement force of the multiplate clutch (for example, the position in ETM, the pressure in HCA, or the magnetic field in EMCD) is now reduced in this situation, the excessive torques during the transition from static friction to sliding friction cannot occur. After the transition into sliding friction, the reduction may be discontinued, resulting in behavior as in the normal case.

According to another embodiment, the multiplate clutch is hydraulically actuated, wherein the engagement force that acts in the axial direction is generated by a clutch pressure in a clutch pressure chamber, the clutch pressure chamber being connected via a valve to a system line that is fillable with a hydraulic fluid by means of a pump. When there is a torque request, the valve is initially controlled with an (electrical) limiting valve current (in amperes) for opening the (electrically actuated) valve, wherein during the engagement of the multiplate clutch the (electrical) valve current is then increased to an (electrical) setpoint valve current.

For example, the clutch pressure acts on a piston in the clutch pressure chamber, the piston being displaced in the axial direction by the clutch pressure. The engagement force is transmitted to the plates by the piston.

In particular, during the engagement of the multiplate clutch, the controlled opening of the valve ensures that the clutch pressure exceeds a setpoint clutch pressure by at most 5%.

Thus, when there is a torque request and (before or during) a subsequent engagement of the multiplate clutch, at least the following steps are carried out:

a) Determining a setpoint engagement force of the multiplate clutch, acting in an axial direction, for transmitting a setpoint torque to the output shaft, and determining a setpoint valve current for generating the setpoint engagement force;

b) Determining and setting a limiting engagement force that is less than the setpoint engagement force, by setting a limiting valve current for opening the valve, and c) Setting the setpoint engagement force in a time-delayed manner by increasing the valve current to the setpoint valve current.

In hydraulic systems it has been shown that the torque overshoots are attributable in particular to inertia of the valve. However, the adjustment accuracy of the multiplate clutch is also impaired due to the inertia. This situation is critical as soon as a setpoint torque that is at least 90%, or at least 95%, or at least 99%, of the nominal torque of the multiplate clutch is requested. Specifically at this time the nominal torque may be significantly exceeded, resulting in damage or destruction of the multiplate clutch or other components of the motor vehicle.

During a steady-state or very slow request of a setpoint torque, the system pressure built up in the system line by the pump is typically higher than the clutch pressure in the clutch pressure chamber. In this case, the valve may operate as desired.

For a torque request that necessitates a rapid change or an abrupt change in a setpoint torque, hydraulic volume (in the clutch pressure chamber, for example) is required in order to compress the multiplate clutch. In some cases, this volume may not be provided quickly enough by the pump. The pressure of the hydraulic fluid in the system line thus collapses to the level of the clutch pressure as soon as the valve withdraws too much volume too quickly from the system (or the system line). As a result, for example a valve slide of the valve goes into a stop position, since the valve cannot control normally. As soon as the pump increases the pressure in the system line (system pressure), and the clutch pressure (setpoint clutch pressure) is increased to the target level (setpoint clutch pressure), the valve requires a certain period of time (due to inertia, friction, etc.) to return the valve slide from the stop position back into a control position. Thus, not the desired setpoint clutch pressure, but, rather, the slightly higher pressure of the system line, is set, at least temporarily, in the multiplate clutch. This higher pressure of the system line is greater than a setpoint clutch pressure, so that an engagement force of the multiplate clutch is greater than the setpoint engagement force, and a torque that is higher than the setpoint torque is transmitted.

To prevent this effect, during the filling phase a clutch pressure that is lower than the final desired pressure may be requested from the valve. The lower clutch pressure is set at the valve via a limiting valve current, wherein the limiting valve current is 5%, or 10%, or even 20%, less than a setpoint valve current.

The setting of the limiting valve current is maintained for approximately 0.02 to 0.2 seconds. The setpoint engagement force required for transmitting the setpoint torque is set only afterwards (i.e., with a time delay) by increasing the valve current to the setpoint valve current.

The stated percentages depend on the system in which the multiplate clutch is installed. This system includes the drive unit and the components, provided between the drive unit and the multiplate clutch, that are used for transmitting torques. The limiting valve current results from the occurring overshoots if the setpoint valve current (or the setpoint clutch pressure) were controlled directly. In particular mechanical deformations, system friction, or the like, also play a role. In addition, the duration is dependent on the system. For example, the length of time until the system goes into a uniform sliding phase and the overshoots are eliminated is important. If the stated limits are exceeded, for example components may be damaged, or reactions that are perceptible to a customer (for example, "jerking" or vehicle motions such as yawing) are created.

The valve slide goes into the control position as soon as the reduced clutch pressure is reached. As soon as this occurs, the requested clutch pressure is increased, by regulating the valve, to the target level at which the pump is still able to maintain the pressure in the system line. Overshoots in the clutch pressure or in the transmitted torque may thus be prevented.

If pressure sensors for the pressure in the system line or in the clutch pressure chamber are not present or are not able to provide appropriate measured values, these pressures must be estimated. Based on the pressures that are present at that moment (or possibly estimated), the point in time when the valve slide goes back into the control position must be determined. However, this process, the same as the overall filling phase, should not take an excessively long time. One requirement for the multiplate clutch is in particular that a preferably short time elapses for building up a setpoint torque to be transmitted.

A further requirement for implementing this method is that the determination/estimation of the pressure in the system line should be very precise. This pressure in the system line may be derived from the motor current that drives the pump. However, it must be taken into consideration that the measured current is not directly proportional to the built-up pressure in the system line, since friction and operating point-dependent efficiency losses in the pump and in the motor, as well as errors in the motor current measurement, influence the relationship. These effects should be taken into account, and may be determined by at least partial teaching of the system.

Moreover, a motor vehicle can have a drive unit and a multiplate clutch, which for transmitting torques are situated on a side shaft of the motor vehicle, so that as the result of engaging the multiplate clutch, only one wheel of the motor vehicle is connectable to the drive unit of the motor vehicle in a torque-transmitting manner, wherein the multiplate clutch is controlled with the method described herein.

BRIEF SUMMARY OF THE DRAWINGS

The invention and the technical field are explained in greater detail below with reference to the figures. It is pointed out that the invention is not to be construed as being limited by the illustrated exemplary embodiments. In particular, unless explicitly stated otherwise, it is also possible to extract partial aspects of the information shown in the figures and combine them with other components and findings from the present description and/or figures. Identical objects are denoted by the same reference numerals, so that explanations concerning other figures may possibly be supplementally used. The figures schematically show the following.

DESCRIPTION

Figure 1:
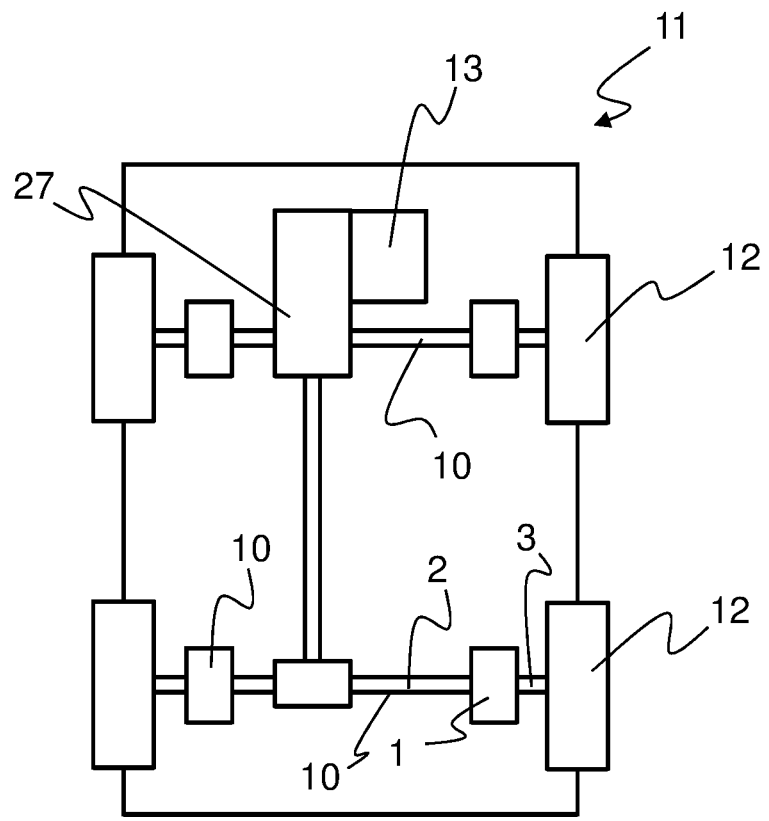
FIG. 1: shows a motor vehicle having a multiplate clutch for driving a wheel of the motor vehicle.

FIG. 1 shows a motor vehicle 11 with a drive unit 13 and a multiplate clutch 1, which for transmitting torques are situated on a side shaft 10 of the motor vehicle 11, so that as the result of engaging the multiplate clutch 1, only one wheel 12 of the motor vehicle 11 is connectable to the drive unit 13 of the motor vehicle 11 in a torque-transmitting manner. The drive unit 13 is connected to the side shafts 10 via a transmission 27. The side shaft 10 includes an input shaft 2 and an output shaft 3, which are connectable to one another in a torque-transmitting manner via the multiplate clutch 1.

Figure 2:
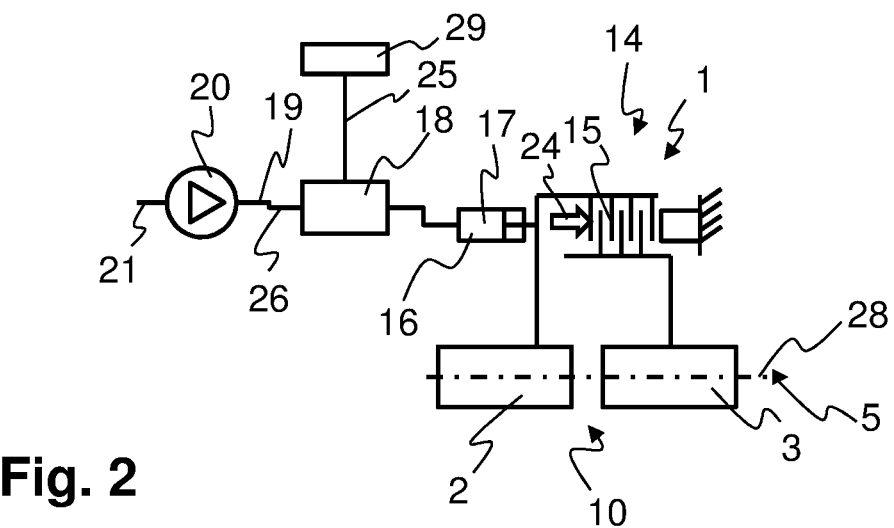
FIG. 2: shows an arrangement of a multiplate clutch on a side shaft, the multiplate clutch being hydraulically actuated.

FIG. 2 shows an arrangement of a multiplate clutch 1 on a side shaft 10, the multiplate clutch 1 being hydraulically actuated. In the multiplate clutch 1, (outer) plates 15 are connected to an outer plate carrier, and (inner) plates 15 are connected to an inner plate carrier, in a rotationally fixed manner. Each plate carrier is connected in a rotationally fixed manner to a component of the group comprising the input shaft 2 and the output shaft 3. The multiplate clutch 1 has a rotational axis 28, and is situated coaxially with respect to the input shaft 2 and the output shaft 3. The plates 15 of the multiplate clutch 1 extend about the rotational axis 28 in the circumferential direction and are connected to plate carriers in a rotationally fixed manner. Due to action by an engagement force 24 in an axial direction 5, the plates 15 are brought into contact with one another, so that a torque 30 may be transmitted from the input shaft 2 to the output shaft 3 via the multiplate clutch 1.

In the present case the multiplate clutch 1 is hydraulically actuated, wherein the engagement force 24 that acts in the axial direction 5 is generated by a clutch pressure 16 in a clutch pressure chamber 17, the clutch pressure chamber 17 being connected via a valve 18 to a system line 19 that is fillable with a hydraulic fluid 21 by means of a pump 20. When there is a torque request 4, the valve 18 is controlled via a control unit 29 with an (electrical) valve current 25 for opening the (electrically actuated) valve 18.

The clutch pressure 16 acts on a piston in the clutch pressure chamber 17, the piston being displaced in the axial direction 5 by the clutch pressure 16. The engagement force 24 is transmitted to the plates 15 by the piston.

During a steady-state or very slow request of a setpoint torque 9, the system pressure built up in the system line 19 by the pump 20 is typically higher than the clutch pressure 16 in the clutch pressure chamber 17. In this case, the valve 18 may operate as desired. For a torque request 4 that necessitates a rapid change or an abrupt change in a setpoint torque 9, hydraulic volume (in the clutch pressure chamber 17, for example) is required in order to compress the multiplate clutch 1. In some cases, this volume may not be provided quickly enough by the pump 20. The pressure of the hydraulic fluid 21 in the system line 19 thus collapses to the level of the clutch pressure 16 as soon as the valve 18 withdraws too much volume too quickly from the system (or the system line 19). As a result, a valve slide of the valve 18 goes into a stop position, for example, since the valve 18 cannot control normally. As soon as the pump 20 increases the pressure in the system line 19 and the clutch pressure 16 is increased to the target level, the valve 18 requires a certain period of time 31 (due to inertia, friction, etc.) to return the valve slide from the stop position back into a control position. Thus, not the desired clutch pressure 16, but, rather, the slightly higher pressure of the system line 19, is set, at least temporarily, in the multiplate clutch 1. This higher pressure of the system line 19 is greater than a setpoint clutch pressure, so that an engagement force 24 of the multiplate clutch 1 is greater than the setpoint engagement force 6, and a torque 30 that is higher than the setpoint torque 9 is transmitted.

To prevent this effect, during the filling phase a clutch pressure 16 that is lower than the final desired pressure may be requested from the valve 18. The lower clutch pressure 16 is set at the valve 18 via a limiting valve current 22, wherein the limiting valve current 22 is less than a setpoint valve current 23.

The setting of the limiting valve current 22 is maintained for a short period of time 31. The setpoint engagement force 6 required for transmitting the setpoint torque 9 is set only afterwards (i.e., with a time delay) by increasing the valve current 25 to the setpoint valve current 23.

The valve slide goes into the control position as soon as the reduced clutch pressure 16 is reached. As soon as this occurs, the requested clutch pressure 16 is increased, by regulating the valve 18, to the target level (the setpoint clutch pressure) at which the pump 20 is still able to maintain the pressure in the system line 19. Overshoots in the clutch pressure 16 or in the transmitted torque 30 may thus be prevented.

Figure 3:
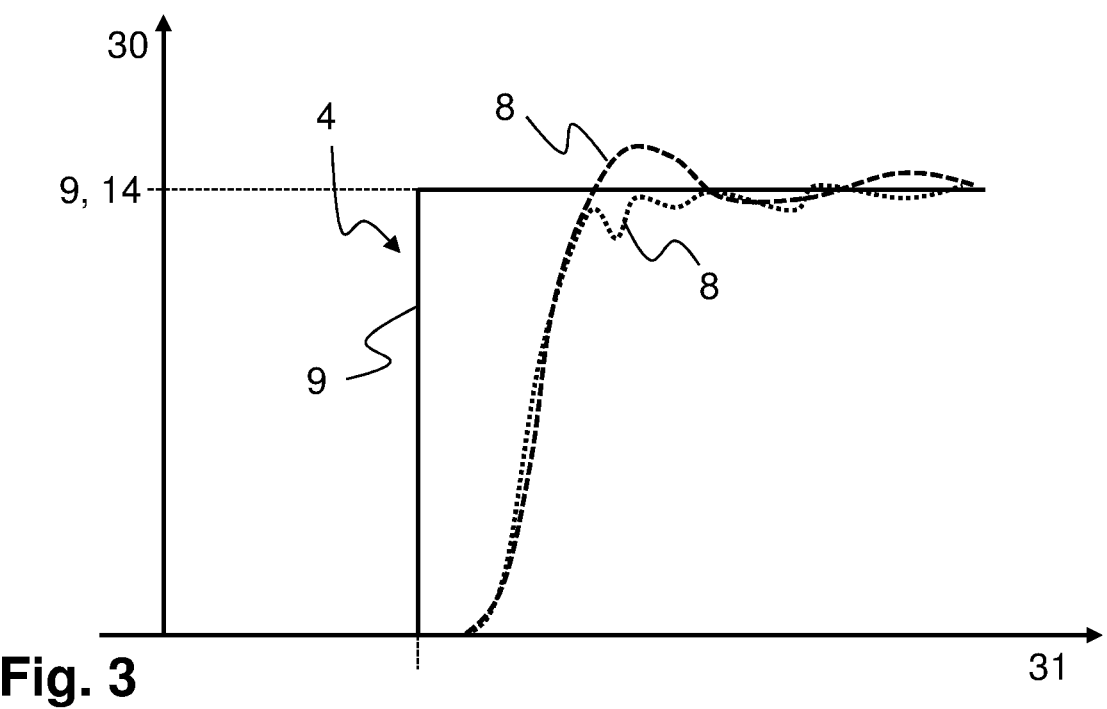
FIG. 3: shows a torque-time diagram.
Figure 4:
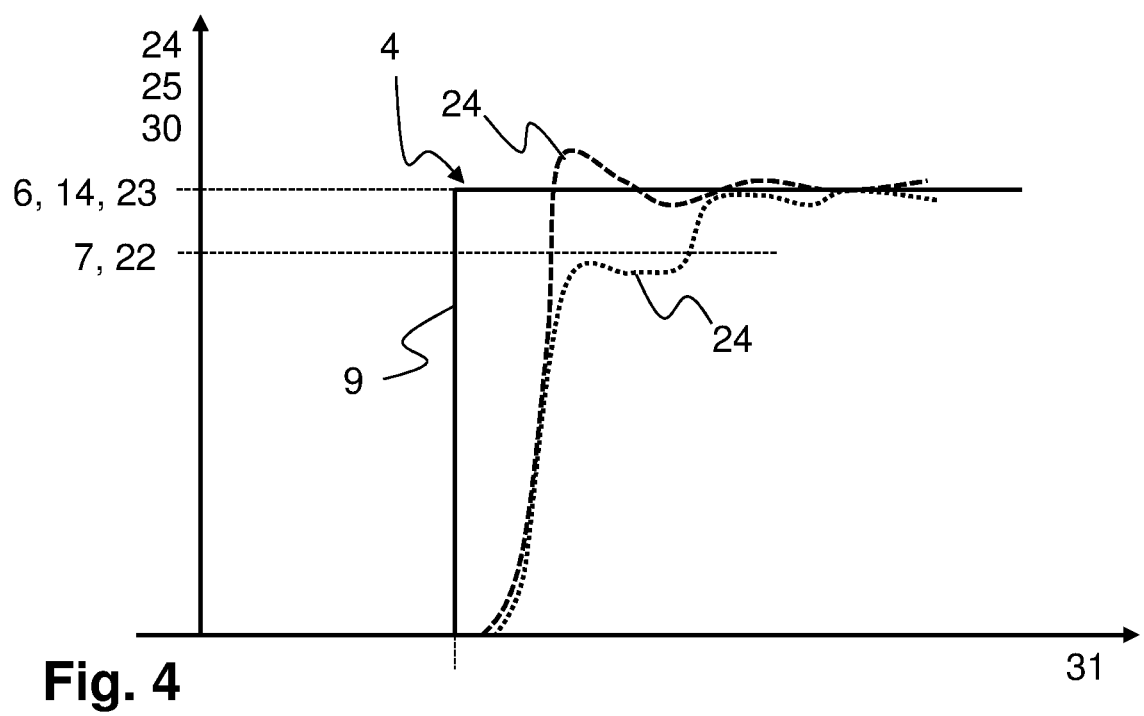
FIG. 4: shows an engagement force/valve current/torque-time diagram.

FIG. 3 shows a torque-time diagram. FIG. 4 shows an engagement force/valve current/torque-time diagram. The diagrams are described together in the following discussion. The proposed method is explained by use of the diagrams.

In the event of a torque request 4 and (before or during) a subsequent engagement of the multiplate clutch 1, the following steps are carried out: A setpoint engagement force 6, acting in an axial direction 5, of the multiplate clutch 1 for transmitting a setpoint torque 9 to the output shaft 3 is determined in step a). A limiting engagement force 7 that is less than the setpoint engagement force 6 is determined and set in step b). The setpoint engagement force 6 is set in a time-delayed manner in step c). A transmission of an actual torque 8 is achieved by limiting the setpoint engagement force 6 to the limiting engagement force 7, wherein a maximum actual torque 8 that is transmitted upon engagement of the multiplate clutch 1 exceeds a setpoint torque 9 to be transmitted by at most 5%.

For transmitting a predefined setpoint torque 9, typically a setpoint engagement force 6 by means of which the plates 15 are pressed together is set at the multiplate clutch 1. It has been shown that, in particular when there is rapid buildup of a torque 30, overshoots occur which greatly exceed the setpoint torque 9 to be transmitted. To avoid or limit these overshoots, it is now proposed that the engagement force 24 is not immediately increased to the setpoint engagement force 6, but, rather, is initially increased only to a limiting engagement force 7.

The setting of the limiting engagement force 7 is maintained for approximately 0.02 to 0.2 seconds. The setpoint engagement force 6 required for transmitting the setpoint torque 9 is set only afterwards (i.e., with a time delay).

It is apparent that the torque request 4 represents an abrupt change in a setpoint torque 9. When there is an abrupt change, within a short time 31 a setpoint torque 9 is increased to a significantly higher value; for example, the setpoint torque 9 as illustrated here is increased by a certain value in a pulsed manner. The setpoint torque 9 that is requested via the torque request 4 represents a nominal torque 14 that is defined for the present multiplate clutch 1.

When the multiplate clutch 1 is hydraulically actuated, the engagement force 24 acting in the axial direction 5 is generated by a clutch pressure 16 in a clutch pressure chamber 17, as described above with reference to FIG. 2. When there is a torque request 4, the valve 18 is initially controlled with a limiting valve current 22 for opening the valve 18, wherein during the engagement of the multiplate clutch 1 the valve current 25 is then increased to a setpoint valve current 23.

The following steps are carried out: In step a) a setpoint engagement force 6, acting in an axial direction 5, of the multiplate clutch 1 for transmitting a setpoint torque 9 to the output shaft 3 is determined, and a setpoint valve current 23 for generating the setpoint engagement force 6 is determined. A limiting engagement force 7 that is less than the setpoint engagement force 6 is determined and set in step b) by setting a limiting valve current 22 for opening the valve 18. The setpoint engagement force 6 is set in a time-delayed manner in step c) by increasing the valve current 25 to the setpoint valve current 23.

LIST OF REFERENCE NUMERALS 1 multiplate clutch
2 input shaft
3 output shaft
4 torque request
5 axial direction
6 setpoint engagement force
7 limiting engagement force
8 actual torque
9 setpoint torque
10 side shaft
11 motor vehicle
12 wheel
13 drive unit 14 nominal torque
15 plate
16 clutch pressure
17 clutch pressure chamber
18 valve
19 system line
20 pump
21 hydraulic fluid
22 limiting valve current
23 setpoint valve current
24 engagement force
25 valve current
26 system pressure
27 transmission
28 rotational axis
29 control unit
30 torque
31 time

The invention claimed is:

1. A method for controlling a multiplate clutch situated between an input shaft and an output shaft for switchable transmission of torques, wherein in an event of a torque request and a subsequent engagement of the multiplate clutch, at least the following steps are carried out:
  a) determining a setpoint engagement force, acting in an axial direction, of the multiplate clutch for transmitting a setpoint torque to the output shaft;
  b) determining and setting a limiting engagement force that is less than the setpoint engagement force, and
  c) setting the setpoint engagement force in a time-delayed manner;
  wherein a transmission of an actual torque is achieved by limiting the setpoint engagement force to the limiting engagement force, so that a maximum actual torque that is transmitted upon engagement of the multiplate clutch exceeds a setpoint torque to be transmitted by at most 5%.

2. The method of claim 1, wherein, for transmitting torques, the multiplate clutch is situated on a side shaft of a motor vehicle, so that as a result of engaging the multiplate clutch, only one wheel of the motor vehicle is connected to a drive unit of the motor vehicle in a torque-transmitting manner.

3. The method of claim 1, wherein the torque request represents an abrupt change in the setpoint torque.

4. The method of claim 1, wherein the setpoint torque that is requested via the torque request represents a nominal torque that is defined for the present multiplate clutch.

5. The method of claim 1, wherein the limiting engagement force during the engagement of the multiplate clutch is eliminated after the transition from a static friction condition, present between the plates, to a sliding friction condition.

6. The method of claim 1, wherein the multiplate clutch is hydraulically actuated, wherein the engagement force that acts in the axial direction is generated by a clutch pressure in a clutch pressure chamber, the clutch pressure chamber being connected via a valve to a system line that is fillable with a hydraulic fluid by means of a pump, and when there is a torque request, the valve is initially controlled with a limiting valve current for opening the valve, wherein during the engagement of the multiplate clutch the valve current is then increased to a setpoint valve current.

7. The method of claim 6, wherein in the event of a torque request and a second subsequent engagement of the multiplate clutch, at least the following steps are carried out:
  a) determining a second setpoint engagement force, acting in the axial direction, of the multiplate clutch for transmitting a second setpoint torque to the output shaft, and determining the setpoint valve current for generating the setpoint engagement force;
  b) determining and setting a second limiting engagement force that is less than the second setpoint engagement force, by setting the limiting valve current for opening the valve, and
  c) setting the setpoint engagement force in the time-delayed manner by increasing the valve current to the setpoint valve current.

8. The method of claim 6, wherein during the engagement of the multiplate clutch, the controlled opening of the valve ensures that the clutch pressure exceeds a setpoint clutch pressure by at most 5%.

9. A system for a motor vehicle, comprising a drive unit and a multiplate clutch which for transmitting torques are situated on a side shaft, so that as a result of engaging the multiplate clutch, only one wheel of the motor vehicle is connectable to the drive unit in a torque-transmitting manner, wherein the multiplate clutch is controlled such that, in an event of a torque request and a subsequent engagement of the multiplate clutch, at least the following steps are carried out:
  a) determining a setpoint engagement force, acting in an axial direction, of the multiplate clutch for transmitting a setpoint torque to an output shaft;
  b) determining and setting a limiting engagement force that is less than the setpoint engagement force, and
  c) setting the setpoint engagement force in a time-delayed manner;
  wherein a transmission of an actual torque is achieved by limiting the setpoint engagement force to the limiting engagement force, so that a maximum actual torque that is transmitted upon engagement of the multiplate clutch exceeds a setpoint torque to be transmitted by at most 5%.

10. The system of claim 9, wherein the torque request represents an abrupt change in the setpoint torque.

11. The system of claim 9, wherein the setpoint torque that is requested via the torque request represents a nominal torque that is defined for the present multiplate clutch.

12. The system of claim 9 wherein the limitation to the limiting engagement force during the engagement of the multiplate clutch is eliminated after a transition from a static friction condition, present between the plates, to a sliding friction condition.

13. The system of claim 9, wherein the multiplate clutch is hydraulically actuated, wherein the engagement force that acts in the axial direction is generated by a clutch pressure in a clutch pressure chamber, the clutch pressure chamber being connected via a valve to a system line that is fillable with a hydraulic fluid by means of a pump, and when there is a torque request, the valve is initially controlled with a limiting valve current for opening the valve, wherein during the engagement of the multiplate clutch the valve current is then increased to a setpoint valve current.

14. The system of claim 13, wherein in an event of a second torque request and a second subsequent engagement of the multiplate clutch, at least the following steps are carried out:
  a) determining a second setpoint engagement force, acting in the axial direction, of the multiplate clutch for transmitting a second setpoint torque to the output shaft, and determining the setpoint valve current for generating the setpoint engagement force;

b) determining and setting a second limiting engagement force that is less than the setpoint engagement force, by setting the limiting valve current for opening the valve, and
c) setting the setpoint engagement force in the time-delayed manner by increasing the valve current to the setpoint valve current.

15. The system of claim 13, wherein during the engagement of the multiplate clutch, the controlled opening of the valve ensures that the clutch pressure exceeds a setpoint clutch pressure by at most 5%.

* * * * *